(12) United States Patent
Zhang et al.

(10) Patent No.: US 6,751,106 B2
(45) Date of Patent: Jun. 15, 2004

(54) CROSS CURRENT CONTROL FOR POWER CONVERTER SYSTEMS AND INTEGRATED MAGNETIC CHOKE ASSEMBLY

(75) Inventors: Richard S. Zhang, Clifton Park, NY (US); James Patrick Lyons, Niskayuna, NY (US); Luis Jose Garces, Niskayuna, NY (US); Xiaoming Yuan, Shanghai (CN)

(73) Assignee: General Electric Company, Niskayuna, NY (US)

( * ) Notice: Subject to any disclaimer, the term of this patent is extended or adjusted under 35 U.S.C. 154(b) by 6 days.

(21) Appl. No.: 10/064,547

(22) Filed: Jul. 25, 2002

(65) Prior Publication Data

US 2004/0017689 A1 Jan. 29, 2004

(51) Int. Cl.[7] .............................. H02M 7/00; H02M 3/24
(52) U.S. Cl. ............................................. 363/71; 363/98
(58) Field of Search ............................. 363/71, 34, 37, 363/39, 40, 80, 81, 89, 97, 98; 336/180, 181; 361/71, 34, 37, 40, 80, 81, 89, 97, 98

(56) References Cited

U.S. PATENT DOCUMENTS

| | | | |
|---|---|---|---|
| 5,212,630 A | 5/1993 | Yamamoto et al. | |
| 5,319,343 A | 6/1994 | Jeffries | |
| 5,446,645 A | * 8/1995 | Shirahama et al. | ........... 363/71 |
| 5,726,615 A | 3/1998 | Bloom | |
| 5,909,367 A | * 6/1999 | Change | ...................... 363/163 |
| 6,169,677 B1 | * 1/2001 | Kitahata et al. | ............... 363/71 |

OTHER PUBLICATIONS

Hiroshi Ohshima and Kazuto Kawakami, "Large Capacity 3–Phase UPS with IGBT PWM Inverter", 1991 IEEE, pp. 117–122, no date.

Tako Kawabata, Shigenori Higashino, "Parallel Operation Of Voltage Source Inverters," IEEE Transactions on Industry Applications, vol. 24, No. 2, Mar./Apr. 1988, pp. 281–287.

J.F.Chen, C.L.Chu, C.L. Huang, "The Parallel Operation Of Two UPS By The Coupled–Inductor Method," IEEE, pp. 733–736, no date.

Keiju Matsui, Yoshihiro Murai, Makoto Watanabe, Mitsutaka Kaneko, and Fukashi Ueda, "A Pulsewidth–Modulated Inverter with Parallel Connected Transistors Using Current–Sharing Reactor," IEEE Transactions on Power Electronics, vol. 8, No. 2, Apr. 1993, pp. 186–191.

Satoshi Ogasawara, Jin Takagaki, Hirofumi Akagi, and Akira Nabae, "A Novel Control Scheme of a Parallel Current–Controlled PWM Inverter," IEEE Transactions on Industry Applications, vol. 28, No. 5, Sep./Oct., 1992, pp. 1023–1030.

(List continued on next page.)

Primary Examiner—Rajnikant B Patel
(74) Attorney, Agent, or Firm—Ann M. Agosti; Patrick K. Patnode

(57) ABSTRACT

A cross current control system for multiple, parallel-coupled power converters includes common mode chokes, local cross current feedback controllers, and local converter controllers. Each common mode choke is coupled to a respective power converter. Each local cross current feedback controller is configured for receiving common mode cross currents from a respective local cross current detector, calculating a resultant cross current, and generating a local feedback control signal. Each local converter controller is configured for using a respective local feedback control signal to drive the respective power converter in accordance with a coordinated switching pattern. An integral choke assembly includes a common mode choke and a differential mode choke with common and differential mode choke cores configured with at least one magnetic flux path being shared by magnetic flux generated by common mode coils and differential mode coils.

40 Claims, 9 Drawing Sheets

OTHER PUBLICATIONS

Yoshihiro Komatsuzako, "Cross Current Control for Parallel Operating Three Phase Inverter," 1994 IEEE,pp. 943–950, no date.

Kun Xing, Fred C. Lee, Dusan Borojevic, Zhihong Ye, and Sudip Mazumder, "Interleaved PWM with Discontinuous Space–Vector Modulation," IEEE Transactions on Power Electronics, vol. 14, No. 5, Sep. 1999, pp. 906–917.

* cited by examiner

CROSS CURRENT CONTROL FOR POWER CONVERTER SYSTEMS AND INTEGRATED MAGNETIC CHOKE ASSEMBLY

BACKGROUND OF INVENTION

Paralleling multiple power converters is a common practice in the telecom and UPS (uninterruptible power supply) industries to increase overall system power capacities and to enhance system reliabilities by building redundancy. Typical examples of such power converters are single phase or three phase converters comprising inverters, rectifiers and DC/DC converters. Typically all the parallel power converters are gated synchronously and are tied together through isolation transformers to limit the cross current. Synchronous gating implies that the gate controls for the parallel converters are perfectly aligned.

Another way to operate the parallel power converters is through interleaved gating. Interleaved gating means that the switching patterns of the parallel converters are uniformly phase shifted, rather than synchronized. Interleaved gating has several advantages such as having reduced harmonic filter size, increased system efficiency, greatly enhanced control bandwidth (and thus improved dynamic performance), and potentially reduced EMI (electromagnetic interference).

Common mode current that circulates among the paralleled multiple converters or within paralleled converter systems that does not contribute to the output to the load is typically referred to as "cross current." Both synchronous and interleaved gating control embodiments typically result in undesirable cross current with the cross current being more severe in interleaved embodiments. In ideal conditions synchronous gating does not lead to cross current, but in actual circuits using synchronous gating cross current exists due to mismatched circuit parameters. One way to reduce the cross current is by using an isolation transformer. In embodiments with isolation transformers, these isolation transformers account for almost one third of the system cost.

The existing techniques for controlling cross current without using an isolation transformer all suffer from certain inherent disadvantages. For example, using current balancers or inter-phase reactors for controlling cross current requires design of an inter-phase reactor. Such design cannot be standardized for arbitrary numbers of converters in parallel.

Another technique of controlling cross current without using isolation transformers is through use of "combined-mode" current control by treating two parallel converters as one converter, selecting the "optimum" switching vector, and adding a current balancer. The "combined-mode approach" is not suitable for more than two converters in parallel because the modulator complication level increases drastically when dealing with more than two parallel converters.

It would therefore be desirable to have an improved cross control system for interleaved or synchronous operation of multiple power converters, arranged in parallel, without using isolation transformers.

SUMMARY OF INVENTION

Briefly, in accordance with one embodiment of the present invention, a cross current control system for multiple, parallel-coupled power converters comprises common mode chokes, local cross current detectors, local cross current feedback controllers and local converter controllers. Each of the common mode chokes is coupled to a respective power converter. Each local cross current detector is configured for obtaining common mode cross currents from a respective output line of a respective power converter. Each of the local cross current feedback controllers is configured for receiving the common mode cross currents from respective local cross current detectors, calculating a resultant cross current, and generating a local feedback control signal. Each of the local converter controllers is configured for using a respective local feedback control signal to drive the respective power converter in accordance with a coordinated switching pattern which may comprise either an interleaved or a synchronous switching pattern with respect to the other power converters.

In accordance with another embodiment of the invention, a method of controlling cross-current through multiple, parallel-coupled power converters comprises providing common mode chokes, each coupled to a respective power converter; and obtaining common mode cross currents from output lines of the power converters. The method further comprises for each respective power converter, calculating a resultant cross current by using the respective common mode cross currents, generating a local feedback control signal by using the resultant cross current, and driving the respective power converter by using the respective local feedback control signal in accordance with a coordinated switching pattern with respect to the other power converters.

In accordance with another embodiment of the invention, an integral choke assembly comprises a common mode choke and a differential mode choke. The common mode choke comprises a common mode core wound with at least two common mode coils and a differential mode choke comprises a differential mode core wound with at least one differential mode coil. The common and differential mode choke cores are configured so that at least one magnetic path is shared by magnetic flux generated by common and differential mode coils.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
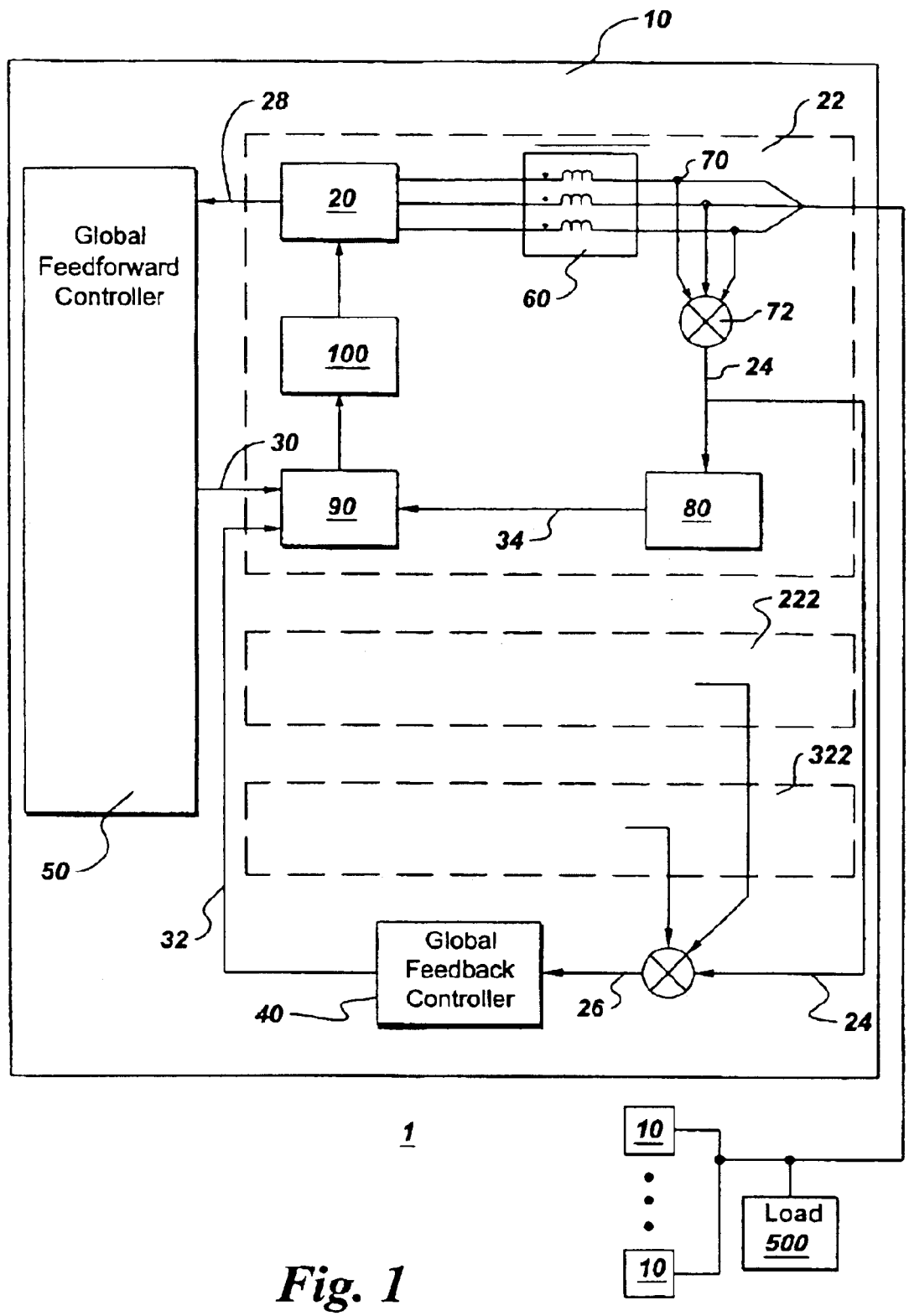
FIG. 1 illustrates a cross current control system according to one embodiment of the invention.

One embodiment of the present invention is a cross current control system 1 comprising a multi-converter system 10 (or multiple multi-converter systems 10), as illustrated in FIG. 1, to limit the cross current among multiple, parallel, power converters 20, operating in a coordinated fashion without an isolation transformer to drive the load 500. The cross current control system comprises at least two power converters and their respective controls which are shown as individual power converter systems 22, 222, and 322 for purposes of example and each comprise a common mode choke 60, local cross current detectors 70, a local cross current feedback controller 80 and a local converter controller 90, and one or more converters 20.

The common mode choke is particularly useful for reducing the cross current at the switching frequency level caused by asynchronous switching patterns (created by interleaved control embodiments or imperfect synchronous control embodiments) applied to each of the parallel power converters. Each of the common mode chokes is coupled to a respective power converter. The local cross current detectors obtain common mode cross currents from output lines of respective power converters and feed them into a summer 72 which outputs the summed common mode current 24 (total cross current through the individual power converter). The local cross current feedback controllers receive the common mode cross currents from respective local cross current detectors (either directly or through the summer), calculate a resultant cross current, and generate a local feedback control signal 34. Each of the local converter controllers uses a respective local feedback control signal to drive the cross current of the respective power converter towards zero in accordance with a coordinated (interleaved or synchronized) switching pattern with respect to the other power converters. The local converter controller can be implemented by using a proportional regulator, an integral regulator, or a proportional-integral regulator for driving a respective cross current to zero. The bandwidth of local converter controller is limited by the switching frequency of the respective power converter.

The local cross current feedback controller, as discussed above, nullifies lower than switching frequency crosscurrent due to imperfectly matched circuit parameters, such as filter parameters, power switches voltage drop, or gate driver dead-time.

In one embodiment, the cross current control system further comprises modulators 100, each of which receives a local converter controller signal from a respective local converter controller and generates a firing signal for driving a respective power converter. The modulator translates a continuous signal from the local converter controller into a switching signal for driving the power converter.

In a more specific embodiment, the cross current control system of FIG. 1 further comprises a global feedforward controller 50, which detects switching signals (patterns) 28 of the power converters and generates counter balance zero-sequence global feedforward control signals 30. Each of the local converter controllers further uses a respective global feedforward control signal 30 (in addition to local feedback control signal 34) to drive the respective power converter. Global feedforward controller 50 takes the information from all the parallel converters in a single converter system and derives a global feedforward control signal for each individual power converter.

In another more specific embodiment, which can be used in conjunction or separately from the global feedforward controller embodiment, the cross current control system of FIG. 1 further comprises a global feedback controller 40, which receives the common mode cross currents from each of the power converters (and the summed total cross current 26 across multiple power converters), calculates a resulting global cross current, and generates global feedback control signals 32. Each of the local converter controllers further uses a respective global feedback control signal to drive the respective power converter (in addition to local feedback control signal 34 and optionally in addition to global feedforward control signal 30).

The global feedforward controller is designed to eliminate the lower frequency cross currents flowing within one multi-converter system 10, while the global feedback controller is used to control the cross current flowing out from one multi-converter system 10 to other multi-converter systems 10 (i.e. referring to FIG. 1, cross current through power converter systems 10). In an embodiment having a plurality of multi-converter systems 10 requiring fast cross current control, all the three controllers (local cross current feedback controller, global feedforward controller and global feedback controller) are particularly useful.

Figure 2:
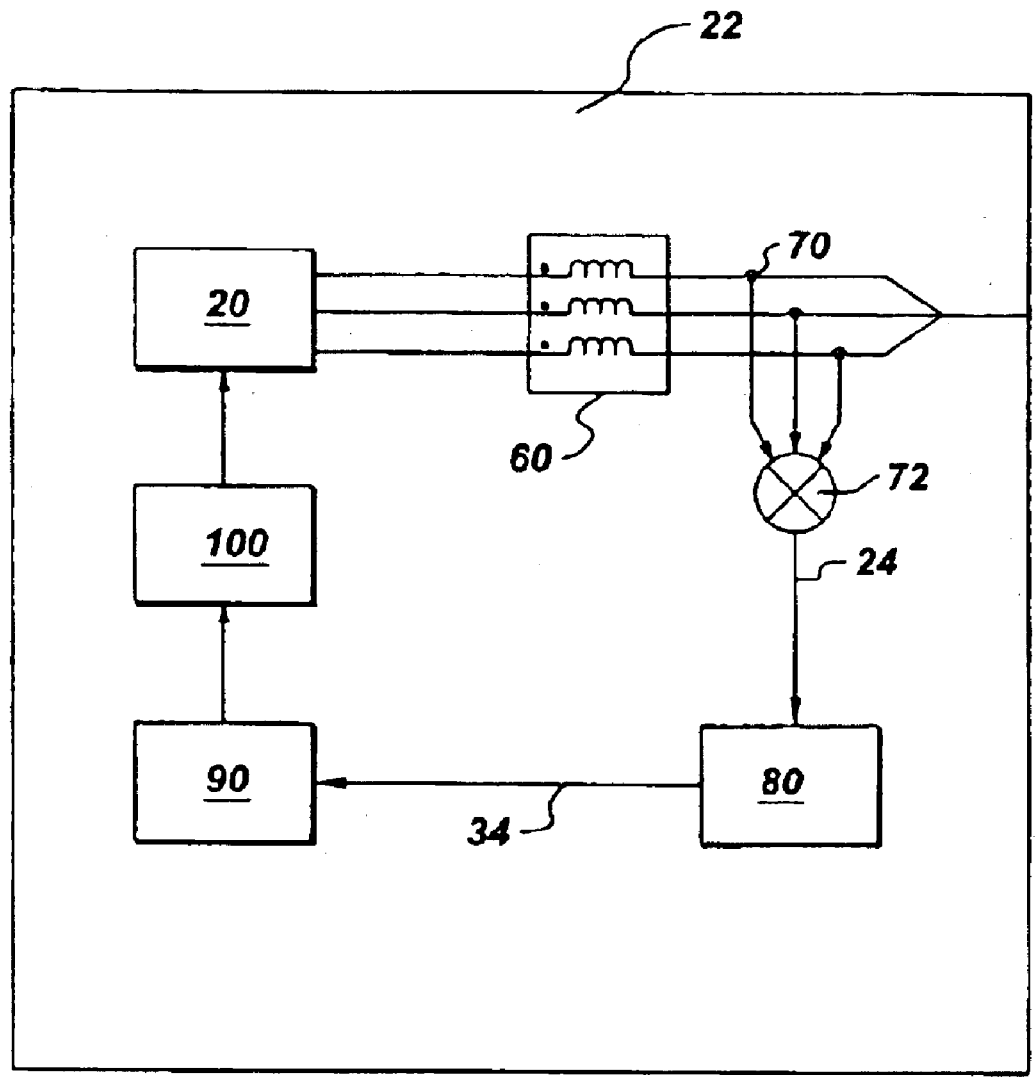
FIG. 2 illustrates a cross current control system for an individual converter according to one embodiment of the invention.

FIG. 2 illustrates a specific embodiment of the invention for an individual power converter system 22. Individual power converter system 22 comprises a common mode choke 60 and local cross current feedback controller 80 for controlling the cross current. The functions of other elements such as local cross current detectors 70, summer 72, local converter controller 90, and modulator 100 are same as described above with respect to FIG. 1.

The cross current control system discussed above applies both to single-phase and three-phase multiple power converters. The parallel converters may be rectifiers, inverters, or DC/DC converters or their combinations for UPS (uninterruptible power supply) or any other power conditioning systems.

Figure 3:
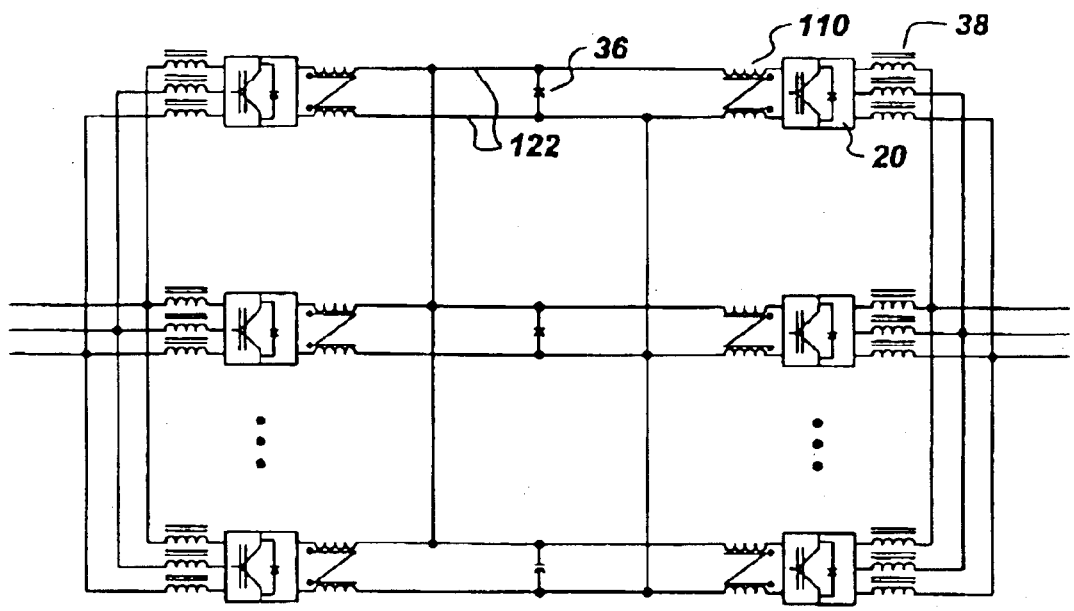
FIG. 3 illustrates a DC link common mode choke with a common DC bus.
Figure 4:
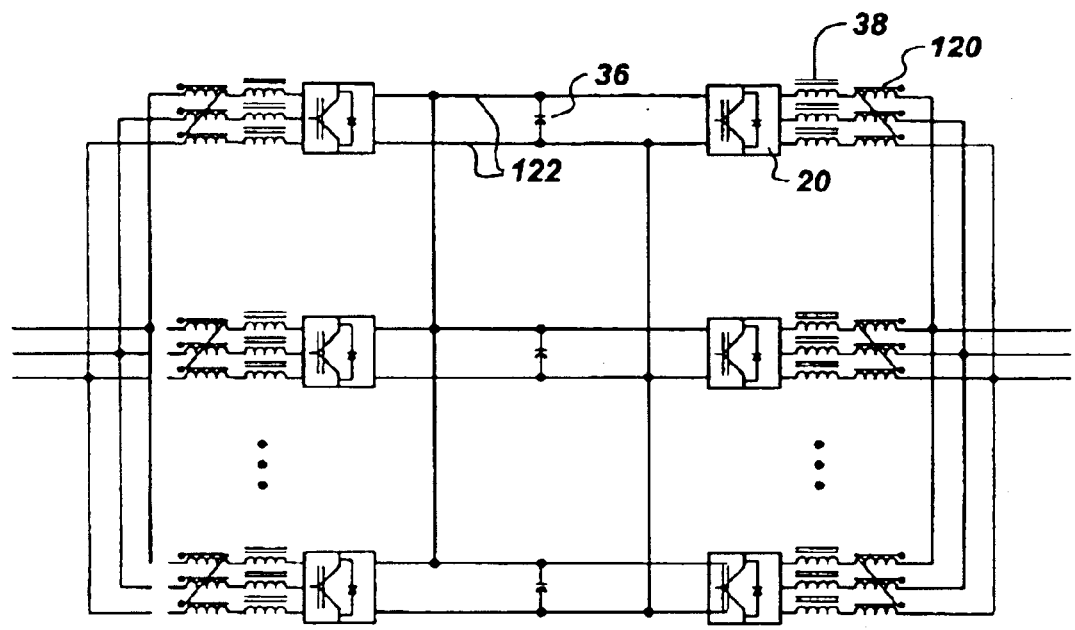
FIG. 4 illustrates an AC link common mode choke with a common DC bus.
Figure 5:
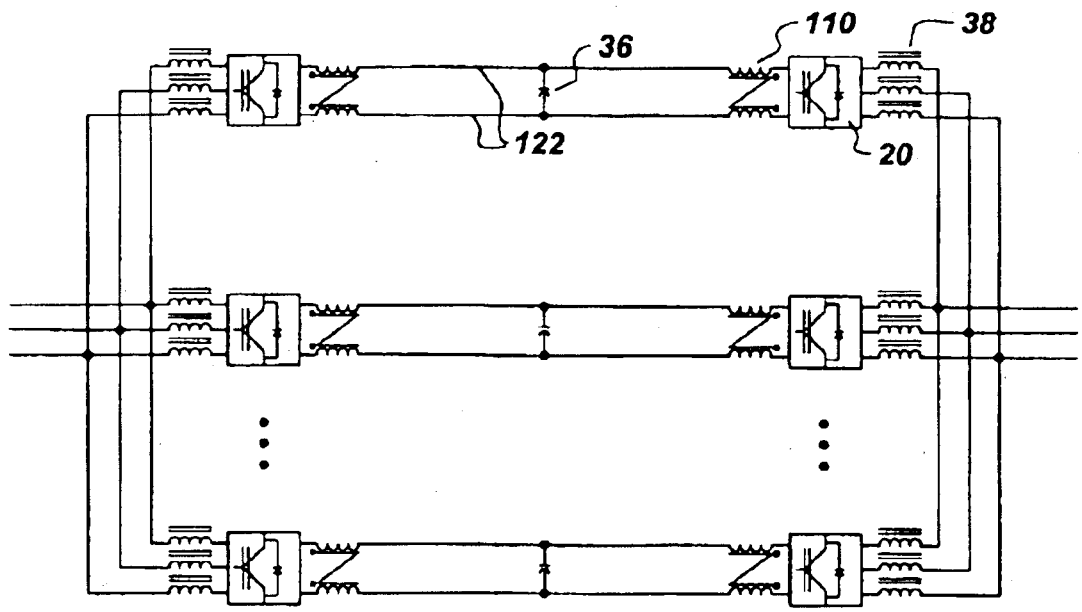
FIG. 5 illustrates a DC link common mode choke with separate DC bus.
Figure 6:
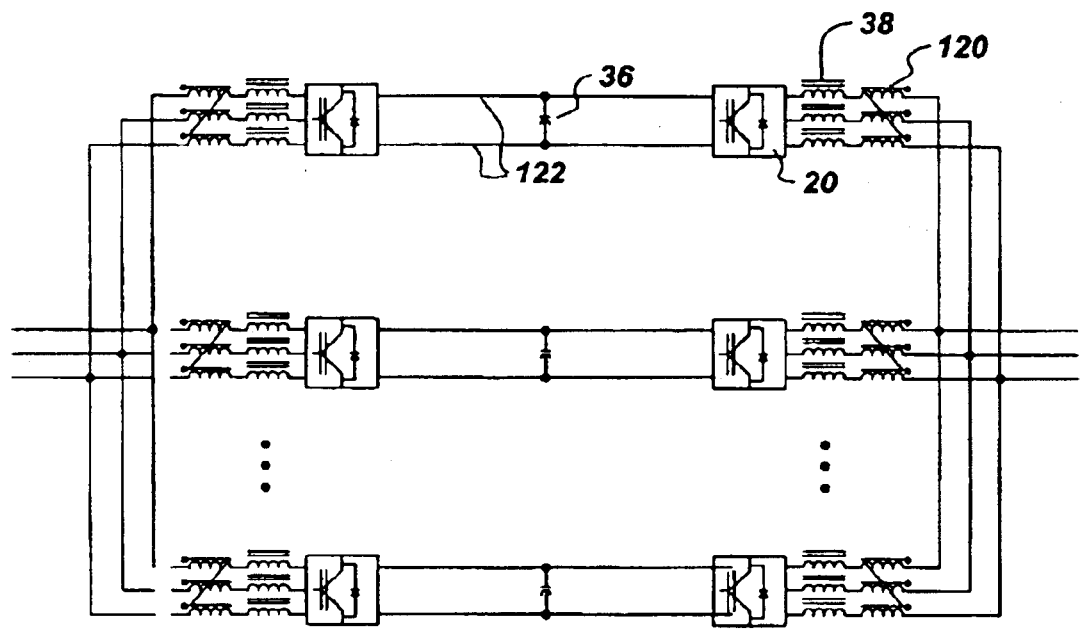
FIG. 6 illustrates an AC link common mode choke with separate DC bus.

FIGS. 3–6 illustrate various embodiments of a power converter system. Although the embodiments shown are for double conversion (AC to DC and DC to AC), they are equally applicable to other converter topologies. Inductor 38 reduces the current ripples, and capacitor 36 smoothes DC link voltage generated during the switching operation of the power converters. Common mode chokes are illustrated as DC link choke 110 in FIGS. 3 and 5 and AC link choke 120 in FIGS. 4 and 6. In the embodiment of the present invention as shown in FIG. 3 and FIG. 4, the power converters share a common DC bus 130. In another embodiment of the present invention as shown in FIG. 5 and FIG. 6, the power converters comprise separate DC busses 130.

In another embodiment of the present invention, the AC link choke comprises a discrete magnetic choke 120 as shown in FIG. 4 and FIG. 6.

Figure 7:
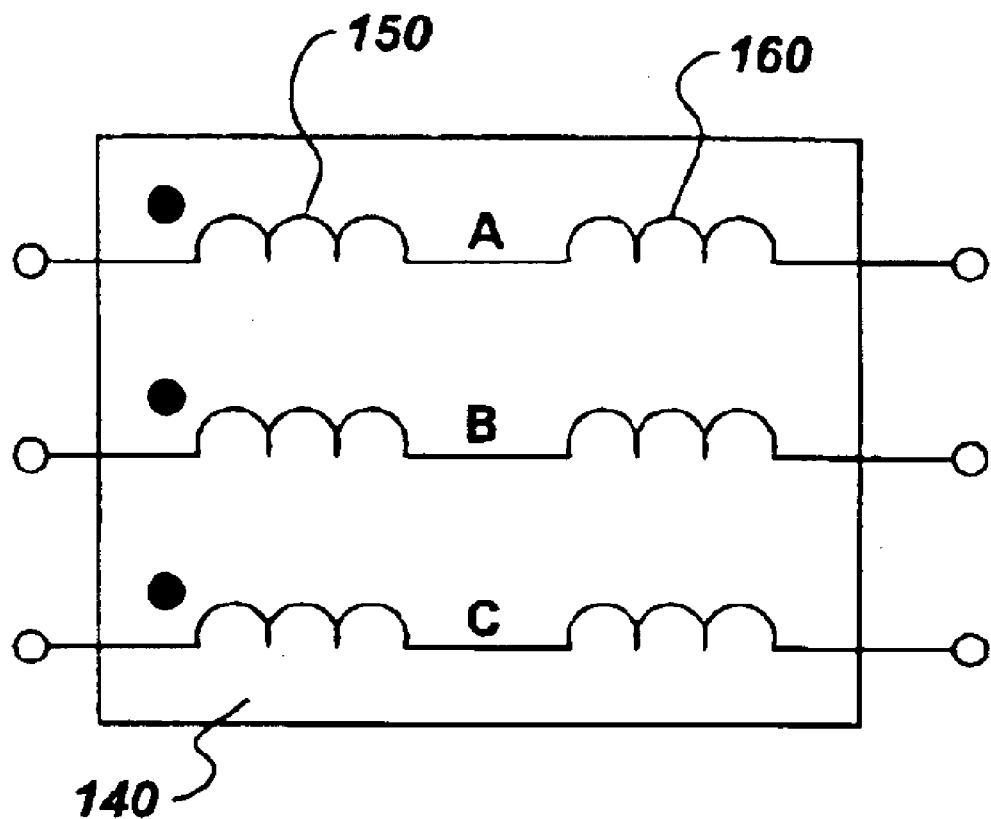
FIG. 7 illustrates an AC link choke comprising an integrated magnetic choke according to one embodiment of the invention.

In another embodiment of the present invention the AC link choke comprises an integrated magnetic choke 140 as shown in FIG. 7. The integrated magnetic choke comprises an integrating magnetic structure to couple a three phase common mode choke 150 and a three phase differential mode choke 160. The integrating magnetic structure comprises a common mode core and a differential mode core. The respective phases of the three phase common mode choke and three phase differential mode choke are connected in series. The integrated magnetic structure minimizes the size and cost of magnetic materials. In one specific embodiment, for example, material expense is minimized by having the common mode core comprise a higher permeability material than the differential core.

Figure 8:
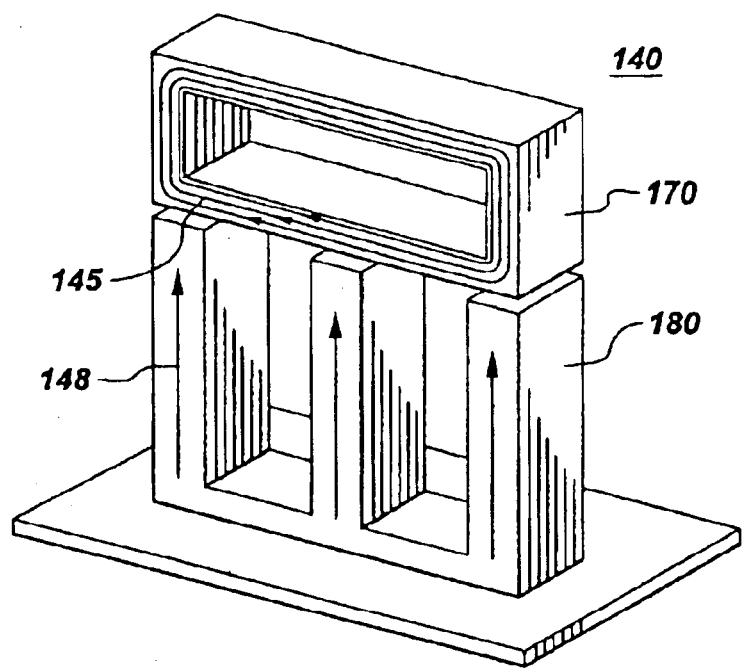
FIG. 8 illustrates an integrated magnetic structure showing a closed rectangular and an E core according to one embodiment of the invention and magnetic flux paths generated by coils shown in FIG. 9.
Figure 9:
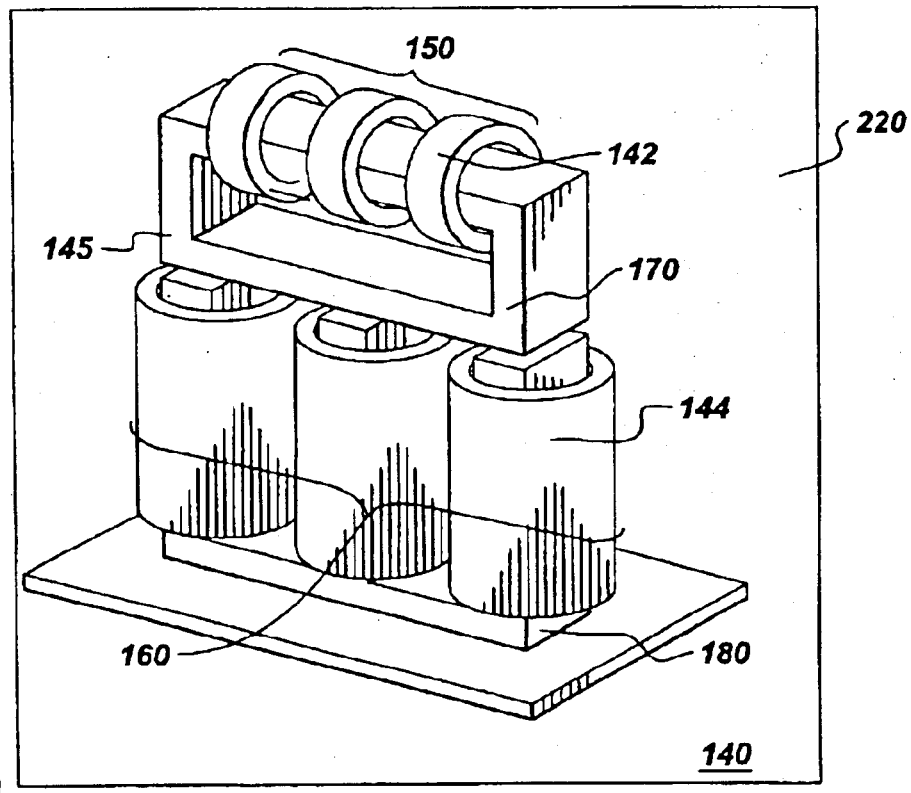
FIG. 9 illustrates the embodiment of FIG. 8 with three common mode coils wound around the closed rectangular core and a respective differential mode coil on each leg of the E core.

In one integrated choke embodiment, as shown in FIG. 8 and FIG. 9, the common mode core comprises a closed rectangular core 170 wound with three common mode coils 142, one for each phase, and the differential mode core comprises an E core 180 wound with a respective differential mode coil 144 on each leg. The E core has a magnetic flux path 148 as shown in FIG. 8. The legs of the E core face the closed rectangular core and share a part of magnetic flux path 145 of the closed rectangular core. The common and differential mode cores are typically held together in spaced apart relation by non-magnetic clamps or adhesive (not shown), for example.

Figure 10:
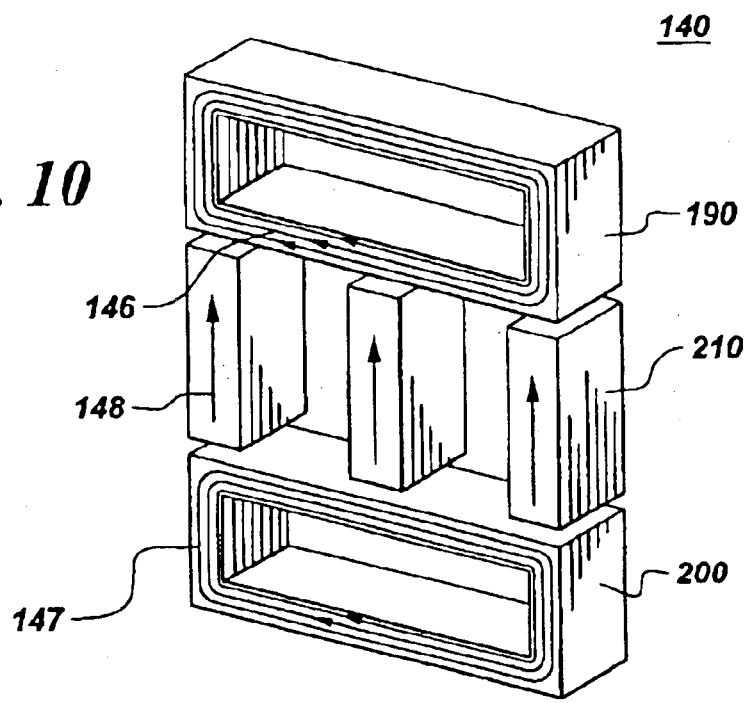
FIG. 10 illustrates an embodiment of the integrated magnetic structure having a top closed rectangular core, a bottom closed rectangular core and three posts.
Figure 11:
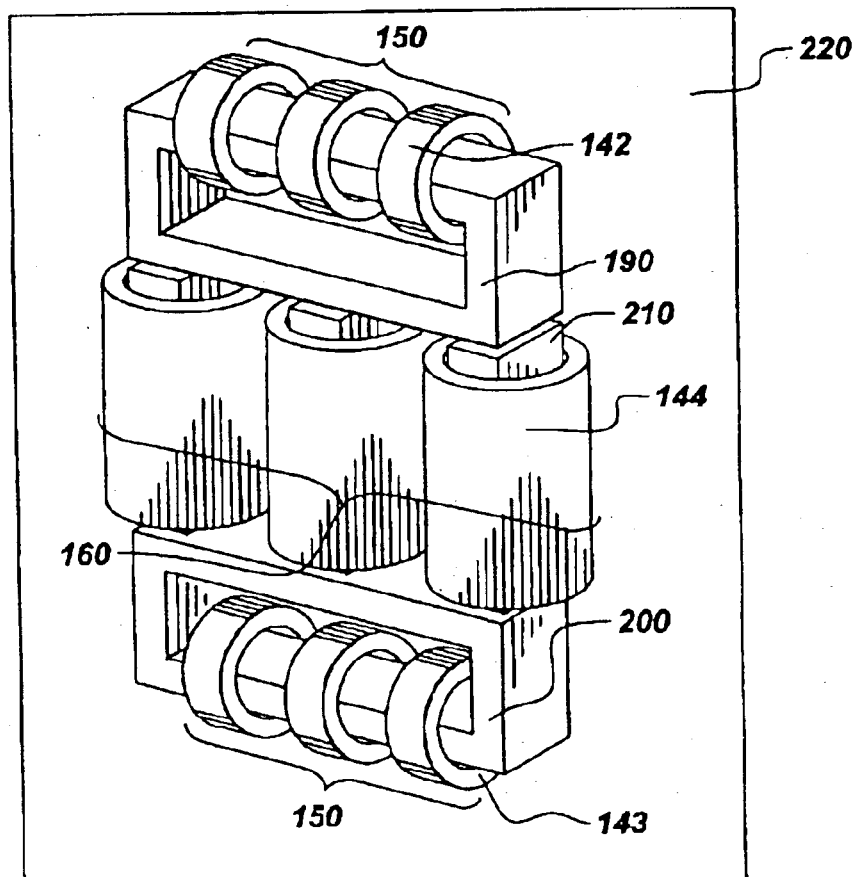
FIG. 11 illustrates the embodiment of FIG. 10 with the top closed rectangular core wound with three common mode top coils, the bottom closed rectangular core wound with three common mode bottom coils and three posts with a respective differential mode coil on each post, and magnetic flux paths generated by coils shown in FIG. 12.
Figure 12:
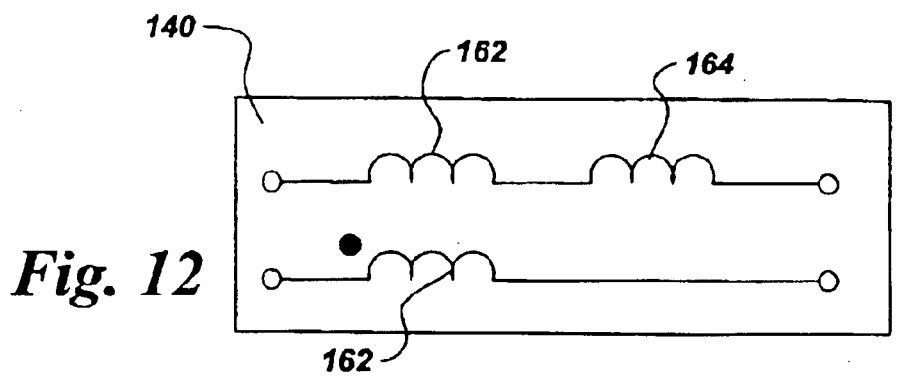
FIG. 12 illustrates an embodiment of the integrated magnetic choke comprising a single phase common mode choke and a single phase differential mode choke.

In another embodiment of the integrated magnetic structure as shown in FIG. 10 and FIG. 11, the common mode core comprises a top closed rectangular core 190 wound with three common mode top coils 142 and a bottom closed rectangular core 200 wound with three common mode bottom coils 143. The differential mode core comprises three posts 210 as shown in FIG. 11, with a respective differential mode coil 144 on each post as shown in FIG. 12. The three posts are arranged between the top and bottom closed rectangular cores and have a magnetic flux path 178. The posts share a part of top and bottom rectangular magnetic flux paths 146 and 147. The integrated magnetic structure of FIG. 11 results in higher common mode inductance than the integrated magnetic structure of FIG. 9.

In accordance with another embodiment of the invention, which is particularly useful in single phase choke embodiments and which is described below for several specific examples, an integral choke assembly comprises a common mode choke and a differential mode choke. The common mode choke comprises a common mode core wound with at least two common mode coils and a differential mode choke comprises a differential mode core wound with at least one differential mode coil. The common and differential mode choke cores are configured so that at least one magnetic flux path is shared by magnetic flux generated by common and differential mode coils.

An another embodiment of the integrated magnetic choke for single phase or DC/DC converters as shown in FIG. 12, comprises an integrated magnetic structure coupling a single phase common mode choke 162 and a single phase differential mode choke 164. The single phase common mode choke and single phase differential mode chokes are connected in series. In one embodiment, the integrated magnetic structure comprises a common mode core and a differential mode core with the common mode core comprising a higher permeability material than the differential mode core.

Figure 13:
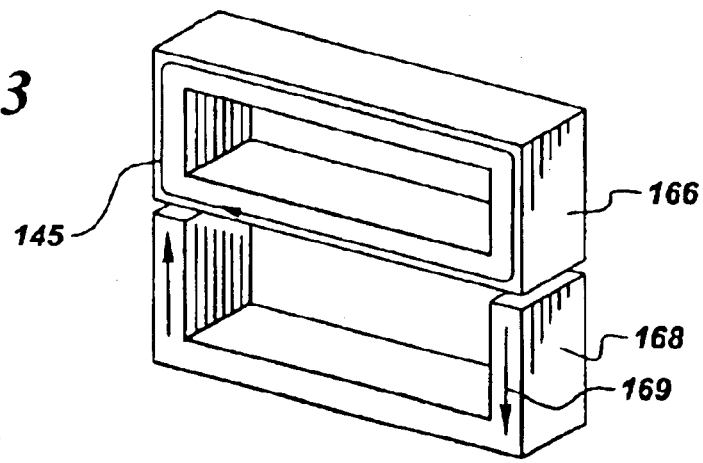
FIG. 13 Illustrates an embodiment of an integrated magnetic structure showing a closed rectangular core and a U core, and magnetic flux paths generated by coils shown in FIG. 14.
Figure 14:
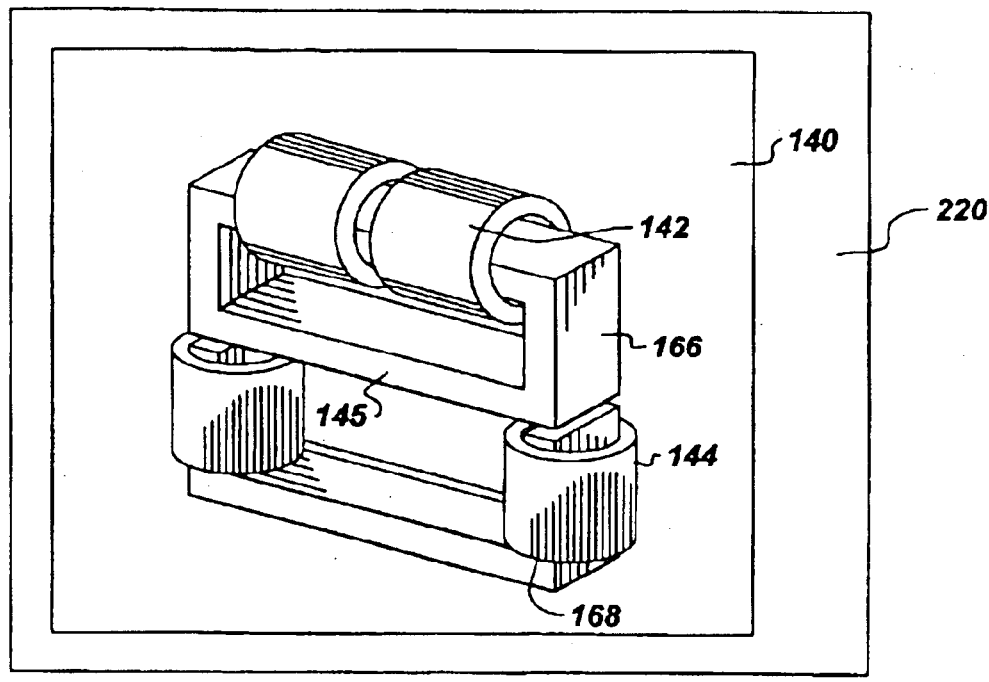
FIG. 14 illustrates an embodiment of FIG. 13 with the top closed rectangular core wound with two common mode coils and a U core wound with two differential mode coils on each leg.

In one example, as shown in FIG. 13 and FIG. 14, the common mode core comprises a closed rectangular core 166 wound with two common mode coils 142 and the differential mode core comprises a U core 168 wound with two differential mode coils 144 on each leg. The legs of U core face the closed rectangular core and have a magnetic flux path 169. The legs share a part of magnetic flux path 145 of the closed rectangular core.

Figure 15:
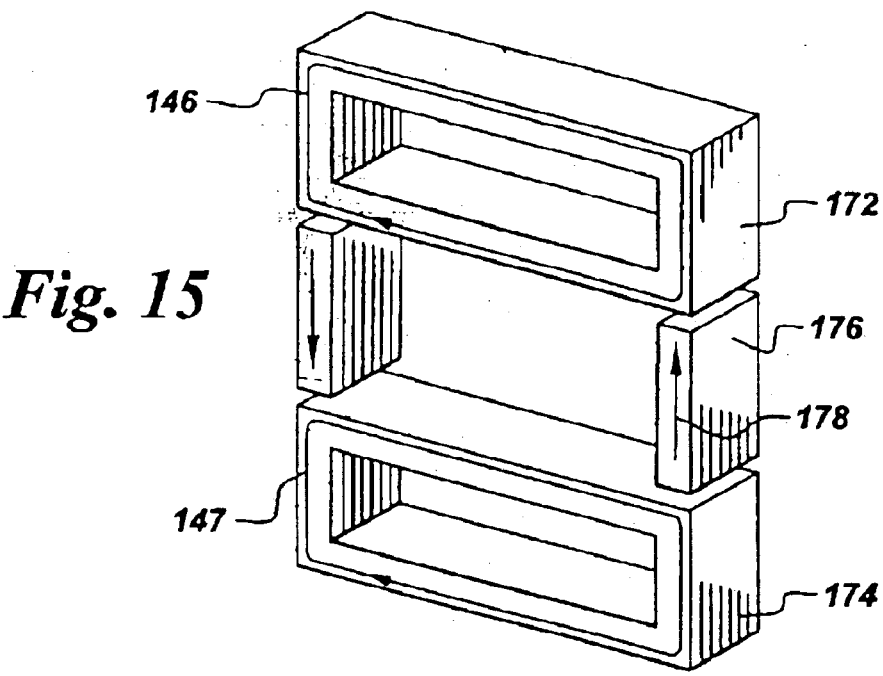
FIG. 15 illustrates an embodiment of an integrated magnetic structure having a top closed rectangular core, a bottom closed rectangular core and two posts, and magnetic flux paths generated by coils shown in FIG. 16.
Figure 16:
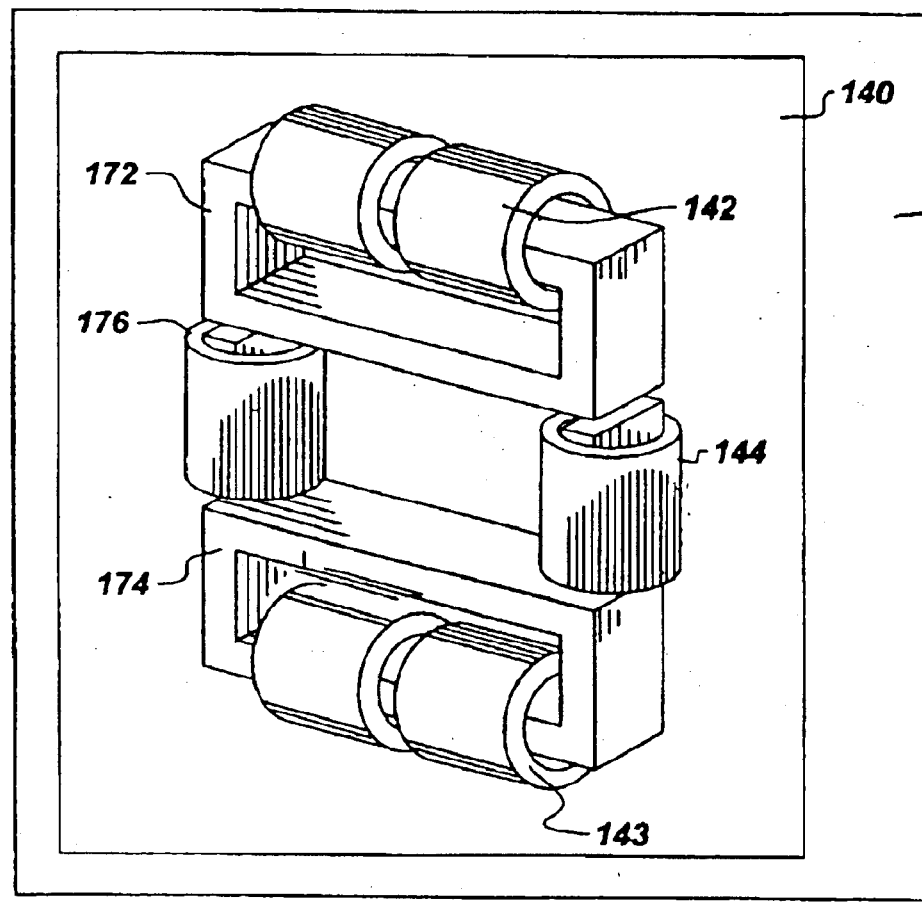
FIG. 16 illustrates an embodiment of FIG. 15 with the top and bottom closed rectangular cores wound with common mode top coils and a common mode bottom coils respectively, and the two posts with a differential mode coil on each post.

In another example, as shown in FIG. 15 and FIG. 16, the common mode core comprises a top closed rectangular core 172 wound with common mode top coils 142 and a bottom closed rectangular core 174, also wound with common mode bottom coils 143. The differential mode core comprises two posts 176 with a differential mode coil 144 on each post. The two posts are arranged between the top and bottom closed rectangular cores and have a magnetic flux path 178. The posts share a part of the magnetic flux paths 146 and 147 of the top and bottom closed rectangular cores.

The various embodiments of integrated chokes 220 discussed above are useful in combination with cross current control systems as discussed above and can be useful in other embodiments as well. For example, integrated choke embodiments are useful for EMI filtering in DC/DC converters.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A cross current control system for multiple, parallel-coupled power converters, the cross current control system comprising:

common mode chokes, each coupled to a respective power converter;

local cross current detectors, each configured for obtaining common mode cross currents from a respective output line of a respective power converter;

local cross current feedback controllers, each configured for receiving the common mode cross currents from respective local cross current detectors, calculating a resultant cross current, and generating a local feedback control signal; and local converter controllers, each configured for using a respective local feedback control signal to drive the respective power converter in accordance with a coordinated switching pattern with respect to the other power converters.

2. The system of claim 1, further comprising a global feedforward controller configured for detecting switching patterns of the power converters and generating counter balance zero-sequence global feedforward control signals, wherein each of the local converter controllers is configured for using a respective global feedforward control signal to drive the respective power converter.

3. The system of claim 2, further comprising a global feedback controller configured for receiving the common mode cross currents from the local cross current detectors, calculating a resulting global cross current, and generating global feedback control signals, wherein each of the local converter controllers is configured for using a respective global feedback control signal to drive the respective power converter.

4. The system of claim 1, further comprising modulators, each configured for receiving a local converter controller signal from a respective local converter controller and generating a firing signal for driving a respective power converter.

5. The system of claim 1, further comprising a global feedback controller configured for receiving the common mode cross currents from the local cross current detectors, calculating a resulting global cross current, and generating global feedback control signals, wherein each of the local converter controllers is configured for using a respective global feedback control signal to drive the respective power converter.

6. The system of claim 1, wherein the power converters are configured to share a common DC bus.

7. The system of claim 1, wherein the power converters comprise separate DC busses.

8. The system of claim 1 wherein the common mode chokes comprise DC link chokes.

9. The system of claim 1 wherein the common mode chokes comprise AC link chokes.

10. The system of claim 9, wherein the AC link chokes comprise discrete magnetic chokes.

11. The system of claim 9, wherein the AC link chokes comprise integrated magnetic chokes.

12. The system of claim 11, wherein each integrated magnetic choke comprises an integrating magnetic structure coupling a three phase common mode choke and a three phase differential mode choke.

13. The system of claim 12, wherein each integrating magnetic structure comprises a common mode core and a differential mode core with the common mode core comprising a higher permeability material than the differential core.

14. The system of claim 13, wherein the common mode core comprises a closed rectangular core wound with three common mode coils, one for each phase, and wherein the differential mode core comprises an E core wound with a respective differential mode coil on each leg, the legs of the E core facing the closed rectangular core and sharing a part of magnetic flux path of the closed rectangular core.

15. The system of claim 13, wherein the common mode core comprises a top closed rectangular core wound with three common mode top coils and a bottom closed rectangular core wound with three common mode bottom coils, and wherein the differential mode core comprises three posts with a respective differential mode coil on each post, the three posts arranged between the top and bottom closed rectangular cores and sharing a part of top and bottom rectangular magnetic flux paths.

16. The system of claim 12, wherein the respective phases of the three phase common mode choke and three phase differential mode choke are connected in series.

17. The system of claim 11, wherein the integrated magnetic choke comprises an integrated magnetic structure coupling a single phase common mode choke and a single phase differential mode choke.

18. The system of claim 17, wherein the integrating magnetic structure comprises a common mode core and a differential mode core with the common mode core comprising a higher permeability material than the differential core.

19. The system of claim 18, wherein the common mode core comprises a closed rectangular core wound with two common mode coils, and wherein the differential mode core comprises a U core wound with two differential mode coils on each leg, the legs of the U core facing the closed rectangular core and sharing a part of magnetic flux path of the closed rectangular core.

20. The system of claim 18, wherein the common mode core comprises a top closed rectangular core wound with two common mode top coils and a bottom closed rectangular core wound with two common mode bottom coils, and wherein the differential mode core comprises two posts with a differential mode coil on each post, the two posts arranged between the top and bottom closed rectangular cores and sharing a part of top and bottom rectangular magnetic flux paths.

21. The system of claim 17, wherein the single phase common mode choke and single phase differential mode choke are connected in series.

22. A cross current control system for multiple, parallel-coupled power converters, the cross current control system comprising:
common mode chokes, each coupled to a respective power converter and comprising an integrated magnetic AC link choke;
local cross current detectors, each configured for obtaining a common mode cross current from a respective output line of a respective power converter;
local cross current feedback controllers, each configured for receiving the common mode cross currents from respective local cross current detectors, calculating a resultant cross current, and generating a local feedback control signal;
a global feedforward controller, configured for detecting switching patterns of the power converters and generating counter balance zero-sequence global feedforward control signals; and
local converter controllers, each configured for using a respective local feedback control signal and a respective global feedforward control signal to drive the respective power converter in accordance with an interleaved switching pattern with respect to the other power converters.

23. The system of claim 22, further comprising a global cross current feedback controller, configured for receiving the common mode cross currents from the local cross current detectors, calculating a resulting global cross current, and generating global feedback control signals, wherein each of the local converter controllers is configured for using a respective global feedback control signal to drive the respective power converter.

24. The system of claim 22, further comprising modulators, each configured for receiving a local converter controller signal from a respective local converter controller and generating a firing signal for driving a respective power converter.

25. The system of claim 22, wherein the integrated magnetic choke comprises an integrating magnetic structure coupling a three phase common mode choke and a three phase differential mode choke.

26. The system of claim 25, wherein the integrating magnetic structure comprises a common mode core and a differential mode core with the common mode core comprising a higher permeability material than the differential core.

27. The system of claim 26, wherein the common mode core comprises a closed rectangular core wound with three common mode coils, one for each phase, and wherein the differential mode core comprises an E core wound with a respective differential mode coil on each leg, the legs of the E core facing the closed rectangular core and sharing a part of magnetic flux path of the closed rectangular core.

28. The system of claim 26, wherein the common mode core comprises a top closed rectangular core wound with three common mode top coils and a bottom closed rectangular core wound with three common mode bottom coils, and wherein the differential mode core comprises three posts with a respective differential mode coil on each post, the three posts arranged between the top and bottom closed rectangular cores and sharing a part of top and bottom rectangular magnetic flux paths .

29. The system of claim 22, wherein the integrated magnetic choke comprises an integrated magnetic structure coupling a single phase common mode choke and a single phase differential mode choke.

30. The system of claim 29, wherein the integrating magnetic structure comprises a common mode core and a differential mode core, the common mode core comprising a higher permeability material than the differential core.

31. A cross current control system for multiple, parallel-coupled power converters, the cross current control system comprising:
   common mode chokes, each coupled to a respective power converter;
   local cross current detectors, each configured for obtaining a common mode cross current from a respective output line of a respective power converter;
   local cross current feedback controllers, each configured for receiving the common mode cross currents from respective local cross current detectors, calculating a resultant cross current, and generating a local feedback control signal;
   a global feedforward controller configured for detecting switching patterns of the power converters and generating counter balance zero-sequence global feedforward control signals;
   a global cross current feedback controller configured for receiving the common mode cross currents from the local cross current detectors, calculating a resulting global cross current, and generating global feedback control signals; and
   local converter controllers, each is configured for using a respective local feedback control signal, a respective global feedback control signal and a respective global feedforward control signal, to drive the respective power converter in accordance with an interleaved switching pattern with respect to the other power converters.

32. A method of controlling cross-current through multiple, parallel-coupled power converters, comprising:
   providing common mode chokes, each coupled to a respective power converter;
   obtaining common mode cross currents from output lines of the power converters; and for each respective power converter,
   calculating a resultant cross current by using the respective common mode cross currents,
   generating a local feedback control signal by using the resultant cross current, driving the respective power converter by using the respective local feedback control signal in accordance with a coordinated switching pattern with respect to the other power converters.

33. The method of claim 32, further comprising detecting switching patterns of the power converters and generating counter balance zero-sequence global feedforward control signals associated with respective power converters, wherein driving the respective power converter comprises using the respective global feedforward control signal.

34. The method of claim 33, further comprising obtaining common mode cross currents from output lines of the power converters; calculating a resulting global cross current; and generating global feedback control signals, wherein driving the respective power converter comprises using the respective global feedback control signal.

35. The method of claim 32, further comprising obtaining common mode cross currents from output lines of the power converters; calculating a resulting global cross current, and generating global feedback control signals associated with respective power converters wherein driving the respective power converter comprises using the respective global feedback control signal.

36. The method of claim 32, wherein providing common mode chokes comprises providing DC link chokes.

37. The method of claim 32, wherein providing the common mode chokes comprises providing AC link chokes.

38. The method of claim 37, wherein providing AC link chokes comprises providing discrete magnetic chokes.

39. The method of claim 38, wherein providing the AC link chokes comprises providing integrated magnetic chokes.

40. A method for controlling a power converter comprising:
   providing an integrated magnetic AC link common mode choke coupled to the power converter;
   obtaining common mode currents from respective output lines of the power converter;
   generating a feedback control signal; and
   driving the power converter by using the feedback control signal.

* * * * *